United States Patent
Baba et al.

(10) Patent No.: US 10,084,354 B2
(45) Date of Patent: Sep. 25, 2018

(54) ELECTRIC MOTOR WITH A PERMANENT MAGNET EMBEDDED ROTOR WITH CURVED MAGNETS AND MAGNET ACCOMMODATION HOLES OF VARYING RADIUSES

(71) Applicant: Mitsubishi Electric Corporation, Tokyo (JP)

(72) Inventors: Kazuhiko Baba, Tokyo (JP); Masahiro Nigo, Tokyo (JP); Kazuchika Tsuchida, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 334 days.

(21) Appl. No.: 14/427,838

(22) PCT Filed: Sep. 20, 2013

(86) PCT No.: PCT/JP2013/075425
§ 371 (c)(1),
(2) Date: Mar. 12, 2015

(87) PCT Pub. No.: WO2014/046228
PCT Pub. Date: Mar. 27, 2014

(65) Prior Publication Data
US 2015/0318743 A1 Nov. 5, 2015

(30) Foreign Application Priority Data

Sep. 24, 2012 (WO) .................. PCT/JP2012/074421

(51) Int. Cl.
*H02K 1/27* (2006.01)
(52) U.S. Cl.
CPC ....... *H02K 1/2766* (2013.01); *H02K 2213/03* (2013.01)

(58) Field of Classification Search
CPC .... H02K 1/2766; H02K 1/27; H02K 2213/03; H02K 1/276
(Continued)

(56) References Cited

U.S. PATENT DOCUMENTS 5,510,662 A * 4/1996 Tanimoto ............... H02K 21/14
310/156.53
5,581,140 A * 12/1996 Futami ................... H02K 1/276
310/156.53
(Continued)

FOREIGN PATENT DOCUMENTS

JP S58-105779 U 7/1983
JP 08251846 * 8/1996
(Continued)

OTHER PUBLICATIONS

JP 08251846 English Translation.*
(Continued)

*Primary Examiner* — Bernard Rojas
*Assistant Examiner* — Maged Almawri
(74) *Attorney, Agent, or Firm* — Posz Law Group, PLC (57) ABSTRACT

An interior permanent magnet motor capable of increasing an output of a motor without reducing torque by increasing demagnetization resistance. The interior permanent magnet motor includes a rotator including a rotator core, and a stator. The rotator core includes a plurality of magnet accommodating holes and a plurality of permanent magnets. The thickness in the short-side direction of each of the magnet accommodating holes is minimum at the center portion of the magnetic pole, and is gradually increased toward the radially outer side of the rotator core. At least the thickness in the short-side direction of the permanent magnet at the center portion of the magnetic pole is equal to the thickness
(Continued)

in the short-side direction of the magnet accommodating hole at the center portion of the magnetic pole.

2 Claims, 7 Drawing Sheets

(58) Field of Classification Search
USPC ............ 310/156.01, 156.53, 156.56, 156.83, 310/156.43, 156.38
See application file for complete search history.

(56) References Cited

U.S. PATENT DOCUMENTS

| | | | | |
|---|---|---|---|---|
| 5,811,904 A * | 9/1998 | Tajima | .................. | H02K 1/276 310/156.45 |
| 5,945,760 A * | 8/1999 | Honda | .................. | H02K 1/276 310/156.53 |
| 6,657,350 B2 * | 12/2003 | Kimura | ................. | H02K 1/276 310/156.53 |
| 6,713,923 B2 * | 3/2004 | Hino | ...................... | H02K 15/03 310/156.38 |
| 6,812,614 B2 * | 11/2004 | Yamamoto | .......... | H02K 19/103 310/156.01 |
| 6,826,824 B2 * | 12/2004 | Hiroyuki | ............... | H02K 15/03 29/596 |
| 6,836,045 B2 * | 12/2004 | Murakami | .......... | H02K 1/246 310/156.53 |
| 6,853,106 B2 * | 2/2005 | Fujiwara | .............. | H02K 1/2713 310/156.53 |
| 7,795,772 B2 * | 9/2010 | Arimitsu | ................ | H02K 1/246 310/156.53 |
| 7,939,982 B2 * | 5/2011 | Horst | .................... | H02K 1/276 310/156.45 |
| 7,952,249 B2 * | 5/2011 | Kori | ..................... | H02K 1/2766 310/156.45 |
| 8,030,817 B2 * | 10/2011 | Sakai | ................... | H02K 1/2766 310/156.43 |
| 8,040,009 B2 * | 10/2011 | Aota | ..................... | H02K 1/276 310/156.38 |
| 8,067,873 B2 * | 11/2011 | Nam | ...................... | H02K 1/246 310/156.78 |
| 8,421,293 B2 * | 4/2013 | Yamashita | ............. | H01F 1/055 148/104 |
| 8,664,822 B2 * | 3/2014 | Vyas | .................... | H02K 1/2766 310/156.39 |
| 8,664,823 B2 * | 3/2014 | Vyas | .................... | H02K 1/2766 310/156.53 |
| 9,130,422 B2 * | 9/2015 | Rahman | ................... | H02K 1/02 |
| 2003/0025415 A1 * | 2/2003 | Hino | ...................... | H02K 15/03 310/156.56 |
| 2003/0094875 A1 * | 5/2003 | Sakuma | ................ | H02K 1/276 310/156.56 |
| 2007/0126304 A1 * | 6/2007 | Ito | ....................... | H02K 1/2766 310/156.53 |
| 2008/0224558 A1 * | 9/2008 | Ionel | ................... | H02K 1/2766 310/156.57 |
| 2009/0322175 A1 | 12/2009 | Kori et al. | | |
| 2012/0091845 A1 * | 4/2012 | Takemoto | ............. | H02K 1/276 310/156.01 |
| 2012/0267975 A1 * | 10/2012 | Nishimura | ............ | H02K 1/148 310/156.01 |
| 2013/0113328 A1 * | 5/2013 | Kogure | ................ | H02K 1/2766 310/156.53 |
| 2014/0265705 A1 * | 9/2014 | Tsuchida | .............. | H02K 1/2766 310/156.38 |

FOREIGN PATENT DOCUMENTS

| | | | |
|---|---|---|---|
| JP | 08251846 | * | 9/1996 |
| JP | H08-251846 A | | 9/1996 |
| JP | 11155247 | * | 11/1997 |
| JP | H11-098721 A | | 4/1999 |
| JP | 11155247 | * | 6/1999 |
| JP | H11-155247 A | | 6/1999 |
| JP | 2000-184640 A | | 6/2000 |
| JP | 4627788 B2 | | 11/2010 |
| JP | 2011-091911 A | | 5/2011 |
| JP | 2012-139068 A | | 7/2012 |

OTHER PUBLICATIONS

JP 11155247 English Translation.*
International Search Report of the International Searching Authority dated Oct. 15, 2013 for the corresponding international application No. PCT/JP2013/075425 (and English translation).

* cited by examiner

ELECTRIC MOTOR WITH A PERMANENT MAGNET EMBEDDED ROTOR WITH CURVED MAGNETS AND MAGNET ACCOMMODATION HOLES OF VARYING RADIUSES

CROSS REFERENCE TO RELATED APPLICATION

This application is a U.S. national stage application of PCT/JP2013/075425 filed on Sep. 20, 2013, which claims priority to Japanese patent application No. 2012-074421, filed on Sep. 24, 2012, the contents of which are incorporated herein by reference.

TECHNICAL FIELD

The present invention relates to an interior permanent magnet motor in which permanent magnets are embedded inside a rotator core.

BACKGROUND ART

In recent years, due to increase in awareness of energy saving, there have been proposed a large number of permanent magnet electric motors configured to use rare-earth permanent magnets having high coercivity in a rotator, to thereby realize high efficiency. However, the rare-earth permanent magnets are expensive, which leads to increase in cost of the electric motor. Therefore, in a rotator of a related-art general interior permanent magnet motor, sintered ferrite magnets are used instead of the rare-earth permanent magnets. When the sintered ferrite magnets are used instead of the rare-earth permanent magnets as described above, the residual flux density, which represents the magnitude of the magnetic force, is reduced to about ⅓. In order to compensate for the lack of torque due to the reduction in magnetic force, it is necessary to arrange, inside the rotator core, sintered ferrite magnets whose surface areas of the permanent magnets are increased as much as possible. Further, reluctance torque is actively used in addition to the torque caused by the permanent magnets. In this manner, the lack of the magnetic force due to the sintered ferrite magnets can be compensated for.

For example, in Patent Literature 1, the following rotator of the interior permanent magnet motor is disclosed. The rotator of the interior permanent magnet motor includes a laminated core and a shaft, and the laminated core includes a plurality of arc-shaped permanent magnets and a plurality of punched holes for accommodating the permanent magnets therein. The plurality of punched holes are formed at a rate of one per pole. Further, each of the plurality of punched holes is arranged so that the protruded portion side of the arc is directed toward the rotator center.

Further, in the interior permanent magnet motor disclosed in Patent Literature 2, permanent magnets each shaped so that the thicknesses of circumferential end portions thereof are different from each other are used. Each of the permanent magnets is arranged so that the end portion having a smaller thickness is positioned on the front side in the rotational direction, and the end portion having a larger thickness is positioned on the rear side in the rotational direction. With such a configuration, an inductance is increased while suppressing the increase in magnetic flux, which causes a counter torque. With this, the reluctance torque is effectively increased, and the increase in core loss is suppressed.

Further, in the interior permanent magnet motor disclosed in Patent Literature 3, a pair of permanent magnet slots, which forms one pole, is arranged in a V-shape in an outer peripheral portion of the rotator core, and the permanent magnets are embedded into the respective permanent magnet slots. That is, in the rotator core, two homopolar permanent magnets are embedded in a V-shape per pole. The thickness of each of the permanent magnets increases from an end portion on the radially inner side of the rotator core, which corresponds to the center part of the V-shape, toward an end portion on the radially outer side of the rotator core, which corresponds to the right or left end portion of the V-shape. Further, curved portions are formed at both end portions of each of the permanent magnets.

CITATION LIST

Patent Literature

[PTL 1] JP 58-105779 U (mainly FIG. 1)
[PTL 2] JP 11-98721 A (mainly FIG. 7)
[PTL 3] JP 4627788 B2 (mainly FIG. 1)

SUMMARY OF INVENTION

Technical Problem

However, the interior permanent magnet motor disclosed in Patent Literature 1 is structured so that each permanent magnet has a uniform thickness in the radial direction. When the thickness of the permanent magnet is uniform, there is a feature in that the magnetic resistance increases toward the center side of the rotator core, and decreases toward the radially outer side of the rotator core. Therefore, the following problems are caused. The smallest magnetic resistance is obtained in the vicinity of both the end portions of the permanent magnet, and thus the demagnetizing field generated by a coil of a stator tends to concentrate on both the end portions of the permanent magnet. Thus, both the end portions of the permanent magnet are demagnetized, and the torque is reduced.

Further, in the interior permanent magnet motor disclosed in Patent Literature 2, permanent magnets each shaped so that the thicknesses of circumferential end portions thereof are different from each other are used. Therefore, the following problems are caused. An imbalanced magnetic resistance is generated, and the demagnetizing field is concentrated on the end portion of the permanent magnet on the front side in the rotational direction, which has a smaller magnetic resistance. When the interior permanent magnet motor is operated in a region with a large current, the demagnetization is caused, and the torque is reduced.

Further, in the permanent magnet electric motor disclosed in Patent Literature 3, a connection portion is provided at the end portions on the radially inner side of the rotator core, which correspond to the center portion of the V-shape. Therefore, such a structure that a magnetic flux easily flows, and the magnetic resistance is remarkably small at the center portion of the V-shape is obtained. Therefore, when sintered ferrite magnets, which each have a smaller coercivity than a sintered rare-earth permanent magnet, are used, there has been a problem in that the permanent magnet in the vicinity of the center portion of the V-shape is demagnetized due to the demagnetizing field. Further, the sintered ferrite magnet has a large electrical resistance, and hence has a feature in that an eddy current is less liable to flow, and is easily demagnetized as the temperature is reduced. Therefore, there has been a problem in that it is impossible to obtain the expected effect of Patent Literature 3, that is, prevention of the heat demagnetization due to the eddy current.

The present invention has been made in view of the above-mentioned circumstances, and has an object to provide an interior permanent magnet motor capable of increasing an output of a motor without reducing torque by increasing demagnetization resistance against a demagnetizing field even when sintered ferrite magnets are used.

Solution to Problem

In order to achieve the above-mentioned object, according to one embodiment of the present invention, there is provided an interior permanent magnet motor, including: a rotator including a rotator core; and a stator provided so as to surround the rotator. The rotator core includes: a plurality of magnet accommodating holes formed as many as the number of poles along a circumferential direction; and a plurality of permanent magnets accommodated in the plurality of magnet accommodating holes. Each of the magnet accommodating holes is formed into a recessed shape when viewed along a rotation axis direction of the rotator, and is arranged so that a recessed side is directed toward an outer side of the rotator. Each of the magnet accommodating holes is formed so as to have a symmetrical shape with respect to a center line of a magnetic pole when viewed along the rotation axis direction of the rotator, and is formed into an integral structure without being divided in the same pole. A thickness in a short-side direction of each of the magnet accommodating holes is minimum at a center portion of the magnetic pole, and is gradually increased toward a radially outer side of the rotator core. At least a thickness in a short-side direction of the permanent magnet at the center portion of the magnetic pole is equal to the thickness in the short-side direction of the corresponding magnet accommodating hole at the center portion of the magnetic pole. Each of the magnet accommodating holes and the permanent magnet are formed so that, when viewed along the rotation axis direction of the rotator and when a radius of an arc on a center side of the rotator core and a radius of an arc on an outer peripheral side of the rotator core in arcs defining the magnet accommodating hole are represented by R1 and R2, respectively, and a radius of an arc on an outer peripheral side of the rotator core in arcs defining the permanent magnet is represented by R3, a relationship of R1>R3>R2 is satisfied. A space portion is formed between each of the magnet accommodating holes and each of both end portions of the corresponding permanent magnet, and the space portion is gradually increased toward the end portion of the corresponding permanent magnet.

Advantageous Effects of Invention

According to one embodiment of the present invention, such effects are obtained that the output of the motor is increased without reducing the torque by increasing the demagnetization resistance against the demagnetizing field.

DESCRIPTION OF EMBODIMENTS

Now, an interior permanent magnet motor according to embodiments of the present invention is described with reference to the accompanying drawings. Note that, in the drawings, the same reference symbols represent the same or corresponding parts.

First Embodiment

Figure 1:
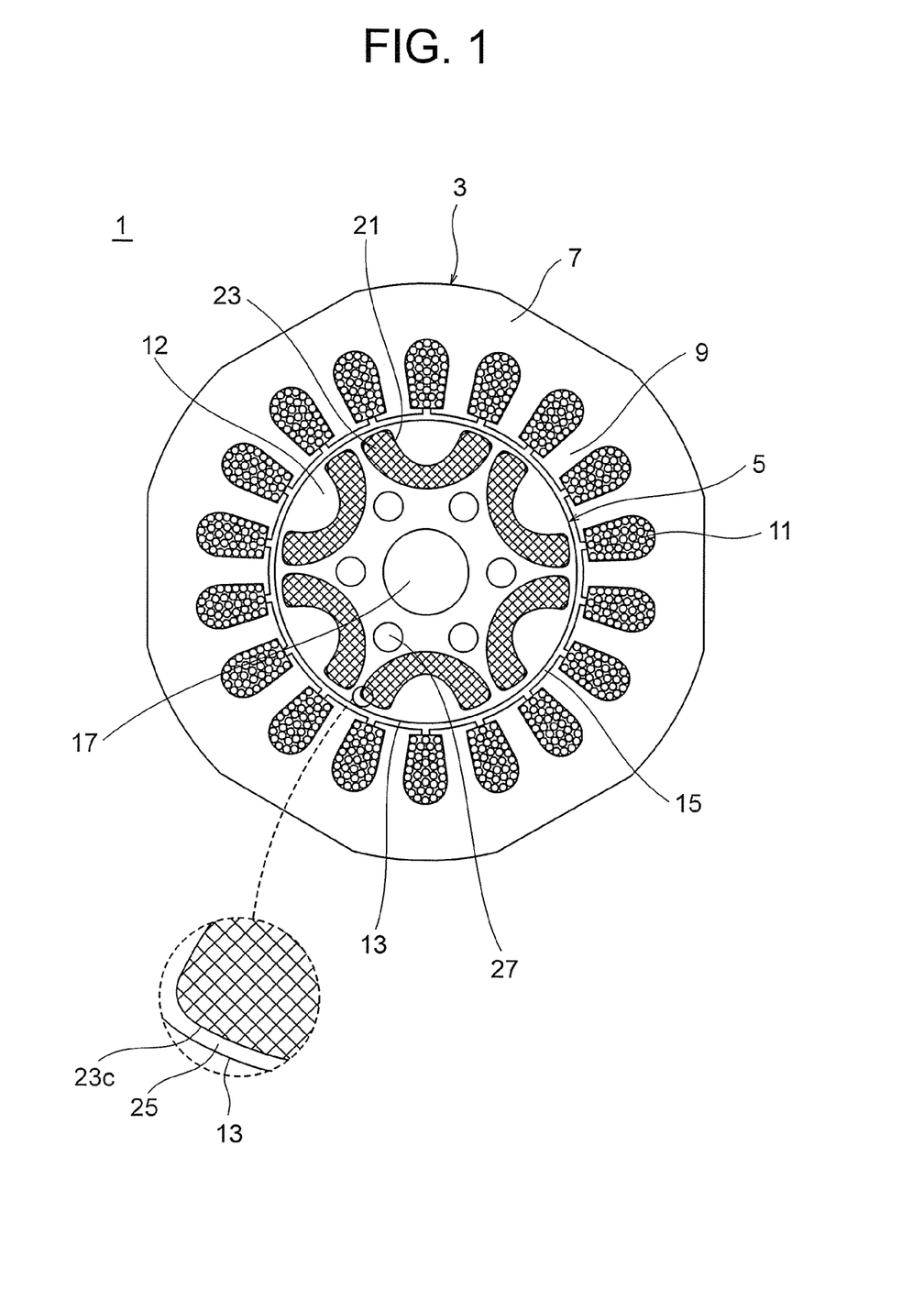
FIG. 1 is a sectional view of an interior permanent magnet motor according to a first embodiment of the present invention.
Figure 2:
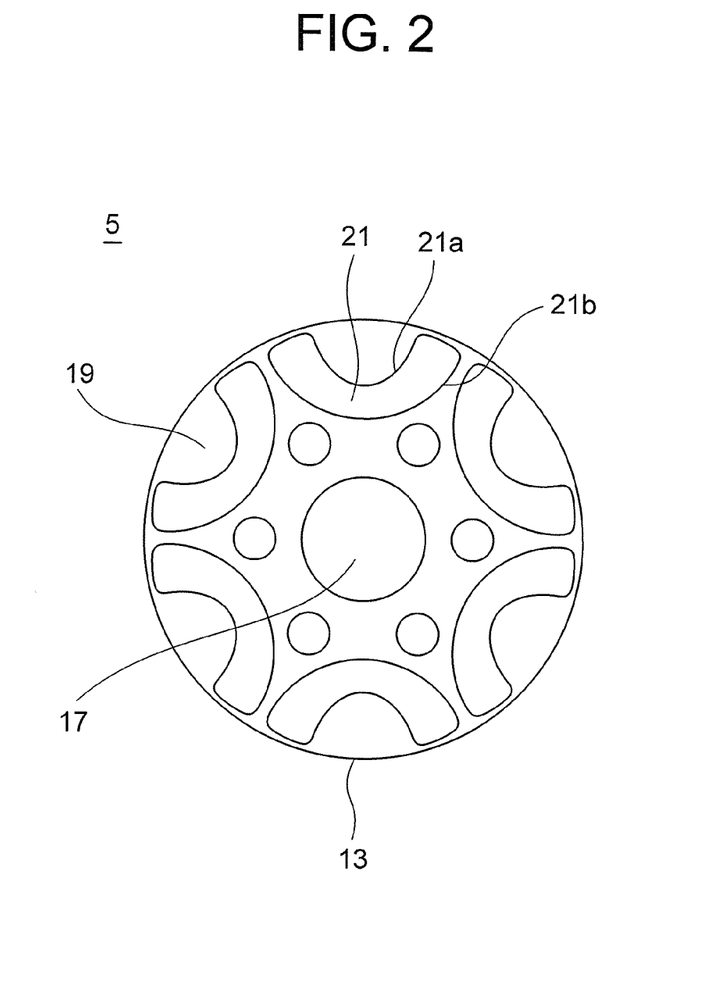
FIG. 2 is a sectional view of a rotator core illustrated in FIG. 1 under a state in which permanent magnets are not set in magnet accommodating holes.
Figure 3:
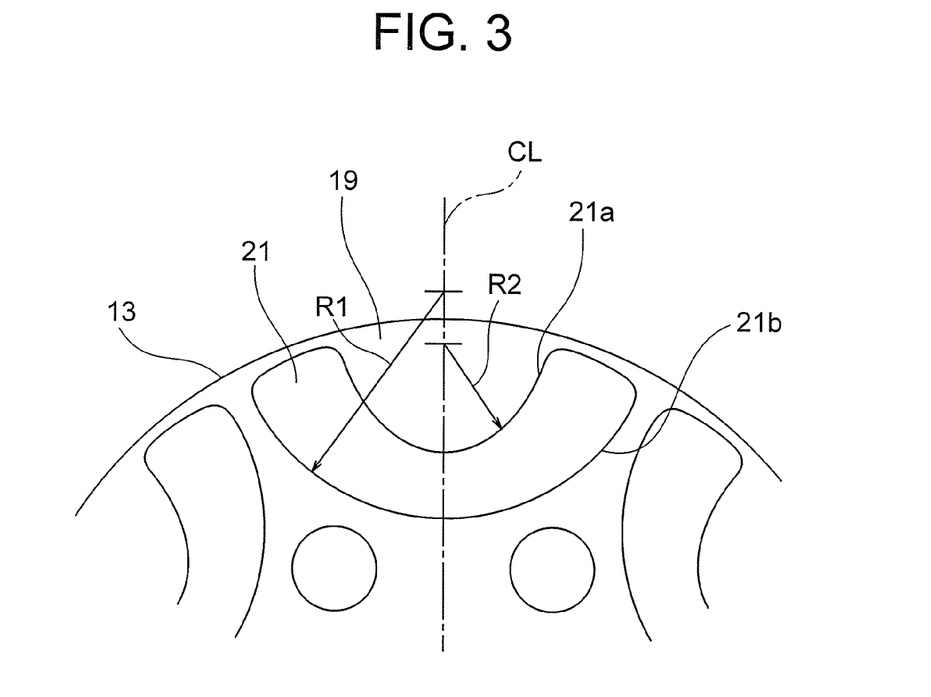
FIG. 3 is a partially enlarged view illustrating a dimensional feature of the magnet accommodating hole of FIG. 2.
Figure 4:
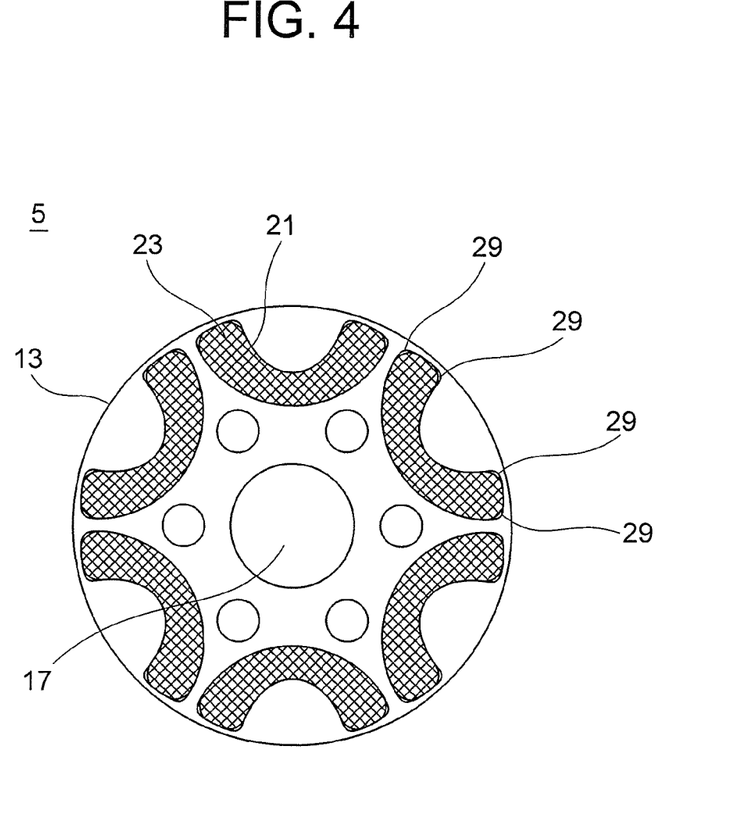
FIG. 4 is a sectional view of a rotator under a state in which the permanent magnets are set in the magnet accommodating holes in FIG. 2.
Figure 5:
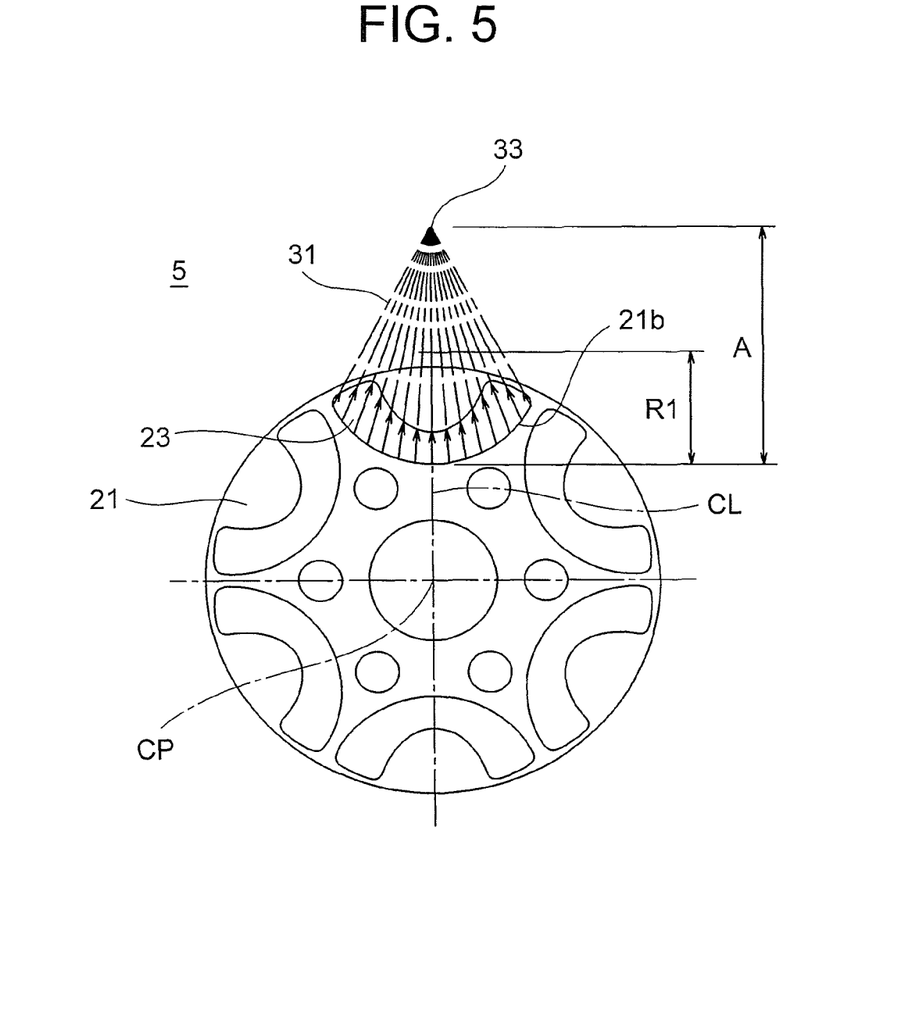
FIG. 5 is a view illustrating an example of magnetic orientation of the permanent magnet.

FIG. 1 is a sectional view of an interior permanent magnet motor according to a first embodiment of the present invention, specifically, a view illustrating a cross section having a rotary shaft of a rotator as the normal. Further, FIG. 2 is a sectional view of a rotator core illustrated in FIG. 1 under a state in which permanent magnets are not set in magnet accommodating holes. FIG. 3 is a partially enlarged view illustrating a dimensional feature of the magnet accommodating hole of FIG. 2. FIG. 4 is a sectional view of a rotator under a state in which the permanent magnets are set in the magnet accommodating holes in FIG. 2. FIG. 5 is a view illustrating an example of magnetic orientation of the permanent magnet.

In FIG. 1, an interior permanent magnet motor 1 according to the first embodiment includes a stator 3 and a rotator 5. The stator 3 includes a stator core 7 having an annular shape, a plurality of teeth 9 formed at equiangular pitches in a circumferential direction (rotational direction of the rotator 5) in an inner peripheral portion of the stator core 7, and a coil 11 wound around each of the teeth 3.

On the inner peripheral side of the stator 3, the rotator 5 is arranged so as to be rotatable, and an annular air gap 15 is formed between an outer peripheral surface 13 of the rotator 5 and the plurality of teeth 9. Note that, the stator 1 of the first embodiment illustrated in FIG. 1 is a distributed winding stator as an example, but the present invention is applicable to a concentrated winding stator as described later.

FIG. 2 illustrates a structure of a rotator core 19 before permanent magnets are inserted therein. The rotator 5 illustrated in FIG. 2 includes, as a main configuration thereof, a rotary shaft 17 for transmitting rotational energy, and the rotator core 19 provided on the outer peripheral portion of the rotary shaft 17. The rotary shaft 17 and the rotator core 19 are coupled to each other by, for example, shrink fitting and press fitting.

The rotator core 19 is produced by laminating a plurality of silicon steel sheets (magnetic steel sheets) subjected to punching with a die, which are called punched core plates, in an extending direction of the rotary shaft 17 (front-back direction of the drawing sheet of FIG. 2). Further, the outer peripheral surface 13 of the rotator core 19 is formed into a cylindrical shape.

In the rotator core 19, a plurality of (six in the illustrated example) magnet accommodating holes 21 are formed so as to be arranged in the circumferential direction in a concyclic manner. As many magnet accommodating holes 21 as the number of poles are arranged. Each of the magnet accommodating holes 21 is formed into an integral structure (formed as one hole for one pole) without being divided in the same pole.

Each of the magnet accommodating holes 21 is formed into a recessed shape when viewed along the rotation axis direction of the rotator 3 (when viewed in a cross section of FIGS. 1 to 7). Specifically, the recessed shape is substantially a U-shape having an inner arc defining line 21*a* and an outer arc defining line 21*b* both extending in an arc shape. Further, each of the magnet accommodating holes 21 is arranged so that a recessed side of the U-shape is directed toward the radially outer side of the rotator 5. Further, the thickness in the short-side direction of the magnet accommodating hole 21 (interval between the inner arc defining line 21*a* and the outer arc defining line 21*b*) is set minimum at the magnetic pole center portion, and to be gradually increased toward the radially outer side of the rotator core 19.

In the rotator core 19, a thinned outer periphery core portion 25 is formed between the outer peripheral surface 13 of the rotator core 19 and a radially outer side surface 23*c* of a permanent magnet 23 (see the reference part enlarged portion of FIG. 1). Note that, a plurality of holes 27 are formed between the rotary shaft 17 and the plurality of magnet accommodating holes 21 so as to pass a coolant and a refrigerant oil therethrough. Specifically, each of the holes 27 is arranged at the center of three members, that is, the rotary shaft 17 and a pair of adjacent magnet accommodating holes 21.

By forming the rotator core 19 as described above, the magnetic resistance in the vicinity of both end portions of the magnet accommodating hole 21 can be increased. With this, the saliency ratio (ratio of the minimum inductance to the maximum inductance) of the rotator core 19 can be increased. Thus, the reluctance torque can be effectively used, and higher torque can be realized.

Next, based mainly on FIG. 3, the dimensional feature of the magnet accommodating hole is described. Referring to FIG. 3, when the curvature radius of the arc defining line 21*b* on the radially outer side of the recess of the magnet accommodating hole 21 (radius of the arc on the center side of the rotator core 19) is represented by R1, and the curvature radius of the arc defining line 21*a* on the radially inner side of the magnet accommodating hole 21 (radius of the arc on the outer peripheral side of the rotator core 19) is represented by R2, the relationship of R1>R2 is satisfied. Further, referring to FIG. 3, the center of curvature of the radius R1 is positioned on the outer side with respect to the outer peripheral surface 13, and, referring to FIG. 3, the center of curvature of the radius R2 is positioned on the inner side with respect to the outer peripheral surface 13. Referring to FIG. 3, the center of curvature of the radius R1 and the center of curvature of the radius R2 are both positioned on a centerline (center line of the magnetic pole) CL of the corresponding magnet accommodating hole 21. Note that, in the first embodiment, each of the permanent magnets 23 is bilaterally symmetrical with respect to the center line of the magnetic pole. That is, the center line CL is the center line of the bilateral symmetry.

Next, the permanent magnet 23 is described. As illustrated in FIG. 4, each of the plurality of permanent magnets 23 is accommodated in the corresponding magnet accommodating hole 21. That is, the permanent magnets 23 forming the magnetic poles of the rotator core 19 are arranged as many as the number of poles in the circumferential direction of the rotator core 19 on the outer peripheral side of the rotator core 19. The plurality of permanent magnets 23 are formed of sintered ferrite magnets.

The outer edge of the permanent magnet 23 is shaped so that at least the thickness in the short-side direction of the permanent magnet 23 at the center portion of the magnetic pole is equal to the thickness in the short-side direction of the corresponding magnet accommodating hole 21 at the center portion of the magnetic pole. In the first embodiment, the outer edge shape of the permanent magnet 23 is substantially the same as the shape of the magnet accommodating hole 21 (technically, the outer edge shape of the permanent magnet 23 is similar to the shape of the magnet accommodating hole 21 with such a dimensional relationship that the permanent magnet 23 can be inserted into the magnet accommodating hole 21). Circumferential corner portions 29 of the permanent magnet 23 are subjected to chamfering as appropriate in order to avoid local partial demagnetization. Further, the respective permanent magnets 23 are magnetized so that the N pole and the S pole are alternately positioned in the rotational direction of the rotator 5.

The interior permanent magnet motor formed as described above has the following excellent advantages.

First, the sintered ferrite magnet has the following feature. The sintered ferrite magnet has a larger electric resistance as compared to an Nd—Fe—B based sintered rare-earth permanent magnet. Therefore, an eddy current is less liable to flow, but the coercivity is extremely small (about ⅓ of that of the sintered rare-earth permanent magnet), and demagnetization is easily caused when the demagnetizing field is applied. On the other hand, the magnetic resistance increases toward the center side of the core when no magnet accommodating hole is formed.

In view of the above, in the first embodiment, the thickness in the short-side direction of the magnet accommodating hole is set minimum on the core center side (pole center portion), and is increased toward the radially outer side of the core. In this manner, the imbalance of the magnetic resistance can be resolved, and the demagnetizing field can be prevented from concentrating on the vicinity of the end portions of the permanent magnet.

Further, each of the permanent magnets 23 employs such a mode that both the end portions thereof are positioned on the radially outer side of the rotator core with respect to the center portion, but does not have a connection portion described above with reference to Patent Literature 3, and hence the demagnetization at the pole center portion can be prevented.

Referring to FIG. 5, the permanent magnet 23 is oriented and magnetized so that a focal point 33 of magnetic orientation 31 is positioned on the center line CL passing through a center CP of the rotator 5 and the center portion of the permanent magnet 23, and positioned on the outer side of the rotator 5. Further, the rotator 5 is formed so that, on the center line CL, a relationship of the curvature radius R1 of the outer arc defining line 21*b* of the magnet accommodating hole 21 (radius of the arc on the center side of the rotator core in the arcs defining the magnet accommodating hole) and a distance A between the outer arc defining line 21*b* and the focal point 33 satisfies A≥2·R1.

With such a configuration, the magnetic flux formed by the permanent magnet 23 is liable to be linked with the coil of the stator 3, and thus the magnetic force of the permanent magnet 23 can be effectively used. Further, the demagnetization resistance of both the end portions of the permanent magnet 23 can be improved.

As described above, in the interior permanent magnet motor according to the first embodiment, even when the sintered ferrite magnets are used, by securing an appropriate magnetic force and increasing the demagnetization resistance against the demagnetizing field, the output of the motor can be increased without reducing the torque.

Second Embodiment

Figure 6:
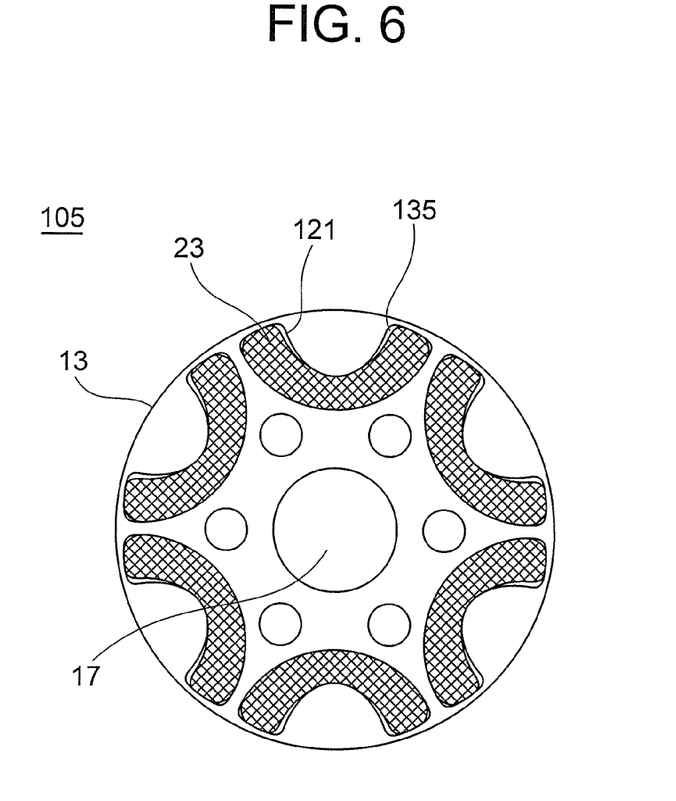
FIG. 6 is a view illustrating the same mode as FIG. 4 according to a second embodiment.
Figure 7:
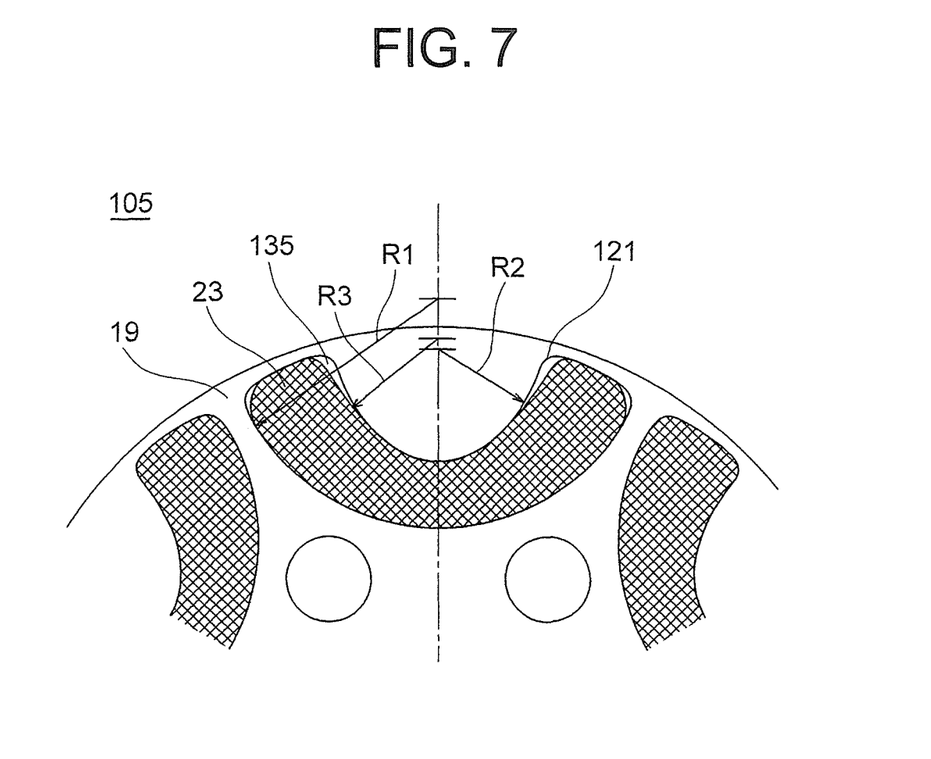
FIG. 7 is a partially enlarged view illustrating a dimensional feature of a magnet accommodating hole of FIG. 6.

Next, a second embodiment of the present invention is described with reference to FIGS. 6 and 7. Note that, the second embodiment is similar to the above-mentioned first embodiment except for the part described below. FIG. 6 is a view illustrating the same mode as FIG. 4 according to the second embodiment. FIG. 7 is a partially enlarged view illustrating a dimensional feature of a magnet accommodating hole of FIG. 6.

As illustrated in FIGS. 6 and 7, in the second embodiment, a magnet accommodating hole 121 and the permanent magnet 23 are formed so that, when the curvature radius of the arc defining line on the outer side of the recess of the magnet accommodating hole 121 (radius of the arc on the center side of the rotator core 19) is represented by R1, the curvature radius of the inner arc defining line of the magnet accommodating hole 121 (radius of the arc on the outer peripheral side of the rotator core 19) is represented by R2, and a radius of the arc on the outer peripheral side of the rotator core 19 in the arcs defining the permanent magnet 23 is represented by R3, a relationship of R1>R3>R2 is satisfied. Further, with this relationship, a space portion 135 is formed between the magnet accommodating hole 121 and each of both the end portions of the permanent magnet 23. The space portion 135 is gradually increased toward the end portion of the permanent magnet 121.

Also in the interior permanent magnet motor of the second embodiment formed as described above, similarly to the above-mentioned first embodiment, the demagnetization resistance can be improved. Further, the space portion is formed between the magnet accommodating hole and the vicinity of each of both the end portions of the permanent magnet, and the space portion is gradually increased toward the end portion of the permanent magnet. Thus, the effect of the demagnetizing field to be applied to both the end portions of the permanent magnet is reduced, and even with this, an advantage of further improving the demagnetization resistance can be obtained.

Details of the present invention have been specifically described above with reference to the exemplary embodiments, but it is needless to say that the above-mentioned embodiments are examples of the details of the present invention, and may be combined with further another publicly known art or may be changed such as partially omitted within a range that does not depart from the gist of the present invention.

REFERENCE SIGNS LIST 1 interior permanent magnet motor, 3 stator, 5, 105 rotator, 7 stator core, 19 rotator core, 21, 121 magnet accommodating hole, 23 permanent magnet, 31 magnetic orientation, 33 focal point, 135 space portion

The invention claimed is:

1. An electric motor with permanent magnet embedded rotor with curved magnets and magnet accommodation holes with varying radiuses, comprising:
    a rotator comprising a rotator core; and
    a stator provided so as to surround the rotator,
    wherein the rotator core comprises:
        a plurality of magnet accommodating holes formed as many as the number of poles along a circumferential direction; and
        a plurality of permanent magnets accommodated in the plurality of magnet accommodating holes,
    wherein the magnet accommodating hole is formed into a recessed shape when viewed along a rotation axis direction of the rotator, and is arranged so that a recessed side is directed toward an outer side of the rotator,
    wherein the magnet accommodating hole is formed so as to have a symmetrical shape with respect to a center line of a magnetic pole when viewed along the rotation axis direction of the rotator, and is formed into an integral structure without being divided in the same pole,
    wherein a thickness in a short-side direction of the magnet accommodating hole is minimum at a center portion of the magnetic pole, and is gradually increased toward a radially outer side of the rotator core,
    wherein at least a thickness in a short-side direction of the permanent magnet at the center portion of the magnetic pole is equal to the thickness in the short-side direction of the corresponding magnet accommodating hole at the center portion of the magnetic pole,
    wherein the magnet accommodating hole and the permanent magnet are formed so that, when viewed along the rotation axis direction of the rotator and when a curvature radius of an arc on a center side of the rotator core and a curvature radius of an arc on an outer peripheral side of the rotator core in arcs defining the magnet accommodating hole are represented by R1 and R2, respectively, and a radius of an arc on an outer peripheral side of the rotator core in arcs defining the permanent magnet is represented by R3, a relationship of R1>R3>R2 is satisfied, and
    wherein a space portion is formed between the magnet accommodating hole and each of both end portions of the corresponding permanent magnet, and the space portion is gradually increased toward the end portion of the corresponding permanent magnet.

2. An interior permanent magnet motor according to claim 1,
    wherein, when viewed along the rotation axis direction of the rotator, the permanent magnet is oriented and magnetized so that a focal point of magnetic orientation is positioned on the center line passing through a center of the rotator and the center portion of the magnetic pole of the permanent magnet, and positioned on the outer side of the rotator, and
    wherein the rotator is formed so that, when a distance between the arc on the center side and the focal point is represented by A, a relationship of A>2·R1 is satisfied.

* * * * *